(12) United States Patent
Maini

(10) Patent No.: US 10,302,068 B2
(45) Date of Patent: May 28, 2019

(54) CONVERSION OF MOVABLE OFFSHORE DRILLING STRUCTURE TO WIND TURBINE APPLICATION

(71) Applicant: ZENTECH, INC., Houston, TX (US)

(72) Inventor: Ramesh Maini, Houston, TX (US)

(73) Assignee: ZENTECH, INC., Houston, TX (US)

( * ) Notice: Subject to any disclaimer, the term of this patent is extended or adjusted under 35 U.S.C. 154(b) by 0 days.

(21) Appl. No.: 15/799,529

(22) Filed: Oct. 31, 2017

(65) Prior Publication Data

US 2018/0119676 A1 May 3, 2018

Related U.S. Application Data

(60) Provisional application No. 62/414,922, filed on Oct. 31, 2016.

(51) Int. Cl.
*B63B 9/00* (2006.01)
*E02B 17/08* (2006.01)
(Continued)

(52) U.S. Cl.
CPC .............. *F03D 13/25* (2016.05); *B63B 9/065* (2013.01); *B63B 35/4413* (2013.01); *E02B 17/021* (2013.01); *E02B 17/0836* (2013.01); *F03D 13/10* (2016.05); *F03D 13/40* (2016.05); *B63B 2009/005* (2013.01); *B63B 2035/446* (2013.01); *E02B 2017/006* (2013.01); *E02B 2017/0039* (2013.01); *E02B 2017/0052* (2013.01); *E02B 2017/0065* (2013.01); *E02B 2017/0082* (2013.01); *E02B 2017/0091* (2013.01); *F05B 2230/61* (2013.01); *F05B 2230/6102* (2013.01); *F05B 2230/80* (2013.01);
(Continued)

(58) Field of Classification Search
CPC .............. B63B 2009/005; B63B 9/065; E02B 2017/0052
See application file for complete search history.

(56) References Cited

U.S. PATENT DOCUMENTS 3,673,974 A * 7/1972 Harper ................ B63B 35/4413
114/265
4,265,568 A * 5/1981 Herrmann ............. E02B 17/021
405/196

(Continued)

FOREIGN PATENT DOCUMENTS

EP 2146006 * 1/2010
WO 2012144952 A1 10/2012

OTHER PUBLICATIONS

"Mobile Rig Refurbishment," Stewart &Stevenson, 2010.*
(Continued)

*Primary Examiner* — Frederick L Lagman
(74) *Attorney, Agent, or Firm* — Patterson + Sheridan, LLP

(57) ABSTRACT

The present disclosure generally relates to movable offshore platforms for installing wind turbines, and methods of forming the same. The movable offshore platforms are offshore platforms which were previously used in hydrocarbon production, such as jack-up units. The movable offshore platforms may be decommissioned and retrofitted with equipment for installing wind turbines. The movable offshore platforms may be American-made or otherwise Jones Act compliant. Methods of forming the same are also included.

20 Claims, 4 Drawing Sheets

(51) Int. Cl.
  *F03D 13/25*  (2016.01)
  *B63B 35/44*  (2006.01)
  *F03D 13/40*  (2016.01)
  *B63B 9/06*   (2006.01)
  *E02B 17/02*  (2006.01)
  *F03D 13/10*  (2016.01)
  *E02B 17/00*  (2006.01)

(52) U.S. Cl.
  CPC ......... *F05B 2240/95* (2013.01); *Y02E 10/727* (2013.01); *Y02P 70/523* (2015.11)

(56) References Cited

U.S. PATENT DOCUMENTS

| | | | | |
|---|---|---|---|---|
| 4,269,542 | A * | 5/1981 | Mueller | E02B 17/021 |
| | | | | 405/196 |
| 4,516,882 | A * | 5/1985 | Brewer | B63B 21/502 |
| | | | | 114/265 |
| 4,540,314 | A * | 9/1985 | Falkner, Jr. | B63B 21/502 |
| | | | | 114/265 |
| 5,190,410 | A * | 3/1993 | Nunley | B63B 9/065 |
| | | | | 405/196 |
| 6,524,049 | B1 | 2/2003 | Minnes | |
| 2004/0151549 | A1 * | 8/2004 | Roodenburg | E02B 17/021 |
| | | | | 405/201 |
| 2005/0158125 | A1 * | 7/2005 | Thomas | B63B 35/003 |
| | | | | 405/203 |
| 2008/0131209 | A1 * | 6/2008 | Thomas | B63B 35/003 |
| | | | | 405/198 |
| 2009/0028647 | A1 * | 1/2009 | Bingham | B63B 27/10 |
| | | | | 405/195.1 |
| 2010/0067989 | A1 | 3/2010 | Brown et al. | |
| 2010/0074691 | A1 * | 3/2010 | Maher | B63B 9/06 |
| | | | | 405/195.1 |
| 2012/0027523 | A1 * | 2/2012 | Vanderbeke | E02B 17/021 |
| | | | | 405/195.1 |
| 2013/0115011 | A1 * | 5/2013 | Johnson | E02B 17/021 |
| | | | | 405/196 |
| 2013/0189038 | A1 | 7/2013 | Lenders et al. | |
| 2013/0298815 | A1 * | 11/2013 | Bussemaker | E02B 17/021 |
| | | | | 114/121 |
| 2015/0197318 | A1 * | 7/2015 | Ahn | B63B 35/003 |
| | | | | 405/204 |
| 2015/0219067 | A1 * | 8/2015 | Clymans | B66C 23/185 |
| | | | | 29/889.2 |
| 2015/0330048 | A1 * | 11/2015 | Garder | E02B 17/00 |
| | | | | 405/195.1 |
| 2015/0337798 | A1 * | 11/2015 | Clymans | B66C 23/185 |
| | | | | 212/273 |
| 2015/0368075 | A1 * | 12/2015 | Clymans | B66C 23/185 |
| | | | | 212/273 |
| 2016/0115665 | A1 * | 4/2016 | Haigh | E02B 17/0034 |
| | | | | 405/3 |
| 2017/0369133 | A1 * | 12/2017 | Lambrakos | B63B 35/44 |

OTHER PUBLICATIONS

"Rig Repair Services," Topaz Oil and Gas, Mar. 2012.*
"Topaz World" Issue 11, Apr. 2012.*
"Wind Power for Old Oil Rigs", Renewable Enegy World, Jul. 9, 2004, http://www.renewableenergyworld.com/articles/2004/07/wind-power-for-old-oil-rigs-11489.html.

* cited by examiner

CONVERSION OF MOVABLE OFFSHORE DRILLING STRUCTURE TO WIND TURBINE APPLICATION

CROSS-REFERENCE TO RELATED APPLICATIONS

This application claims benefit of U.S. Provisional Patent Application Ser. No. 62/414,922, filed Oct. 31, 2016, which is herein incorporated by reference.

BACKGROUND

Field

Embodiments of the present disclosure generally relate to movable offshore platforms for installing wind turbines, and methods of forming the same.

Description of the Related Art

Decommissioned offshore moveable oil platforms are often forgotten and allowed to go into a state of disrepair, or may be sunk to form artificial reefs. Occasionally, the decommissioned moveable oil platforms may be stripped for scrap. However, none of these outcomes utilize a decommissioned movable oil platform to full potential of the platform, especially considering the labor and engineering man-hours put into the erection of the platforms.

Therefore, there is a need for a new use of decommissioned moveable offshore oil platforms.

SUMMARY

The present disclosure generally relates to movable offshore platforms for installing wind turbines, and methods of forming the same. The movable offshore platforms are offshore platforms which were previously used in hydrocarbon production, such as jack-up units. The movable offshore platforms may be decommissioned and retrofitted with equipment for installing wind turbines. The movable offshore platforms may be American-made or otherwise Jones Act compliant. Methods of forming the same are also included.

In one example, a method comprises converting a movable offshore platform from a hydrocarbon producing unit to a wind turbine installation unit. The converting includes removing oil production equipment and installing a crane in place thereof.

In another example, a wind turbine installation method comprises converting a movable offshore platform from a hydrocarbon producing unit to a wind turbine installation unit at a first location. The converting includes removing oil production equipment and installing a crane in place thereof. The method further includes transporting the movable offshore platform to a second location, and installing a wind turbine at the second location using the crane on the converted offshore movable platform.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to movable offshore platforms for installing wind turbines, and methods of forming the same. The movable offshore platforms are offshore platforms which were previously used in hydrocarbon production, such as jack-up units. The movable offshore platforms may be decommissioned and retrofitted with equipment for installing wind turbines. The movable offshore platforms may be American-made or otherwise Jones Act compliant. Methods of forming the same are also included.

Figure 1A:
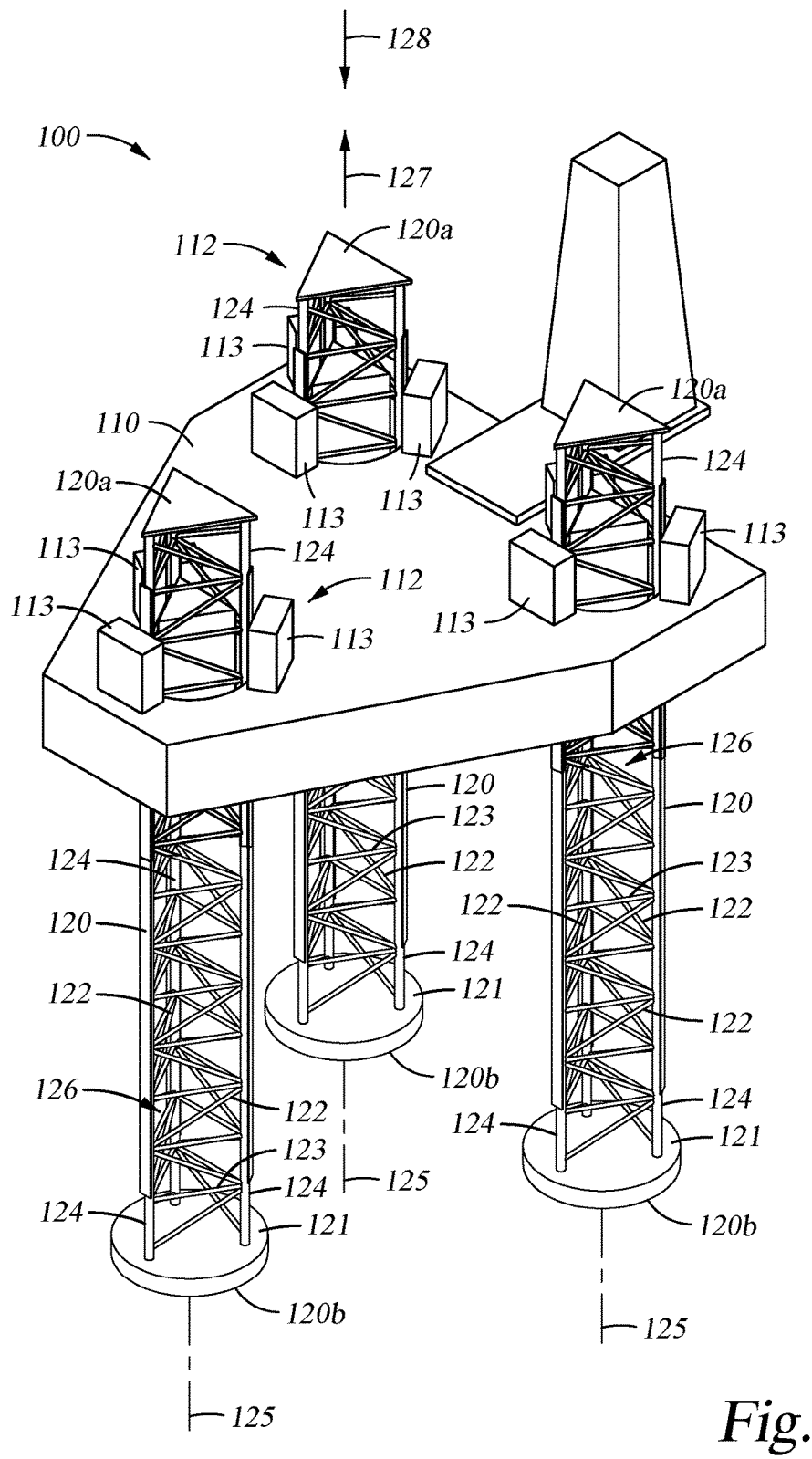
FIG. 1A-1D are schematic views of a movable offshore platform during conversion from hydrocarbon production to a wind turbine installation unit, according to aspects of the disclosure.

FIG. 1A-1D are schematic views of a movable offshore platform during conversion from hydrocarbon production to a wind turbine installation unit, according to aspects of the disclosure. In one example, the movable offshore platform may be a jack-up rig 100. In general, the jack-up rig 100 is a structure designed for offshore drilling operations, as shown in FIG. 1A. The jack-up rig 100 includes a buoyant hull 110, a plurality of elongate support legs 120 movably coupled to hull 110, and drilling equipment, such as a derrick 140, supported by the hull 110. The derrick 140 may be positioned on a derrick support structure such as a cantilever 141 to facilitate horizontal movement of the derrick 140. The jack-up rig 100 is illustrated as having three legs 120; however any suitable number of legs 120 may be utilized, such as four or more legs 120.

Each support leg 120 extends vertically from the hull 110 and has a vertical axis 125, a first or upper end 120a, and a second or lower end 120b opposite the upper end 120a. Each lower end 120b of each support leg 120 includes an optional spud tank 121 configured to engage and penetrate the sea floor during deployment of jack-up rig 100. Additionally, each leg 120 includes a plurality of braces 122 connected edge-to-edge to form a latticed frame 123 having corners 124 and an open interior 126 extending axially between ends 120a, 120b. Although each frame 123 may have a triangular cross-section or square cross-section defined by three or four braces 122, the frame 123 of each leg 120 may have any suitable number of braces 122 and/or cross-sectional geometry.

Each leg 120 is moveably coupled to the hull 110 such that each leg 120 may be independently and controllably moved axially upward and downward relative to the hull 110 in the direction of arrows 127, 128, respectively. In particular, the jack-up rig 100 includes a plurality of jacking systems 112 configured to raise and lower legs 120. One jacking system 112 is provided for each leg 120. In one embodiment, each jacking system 112 includes multiple jacks 113, with each jack 113 secured to the hull 110 and coupled to one corner 124 of a respective leg 120. In general, each jack 113 may comprise any suitable jacking device for raising and lowering the legs of a jack-up rig.

For offshore deployment, the jack-up rig 100 is towed to an offshore drilling location with the buoyant hull 110 floating on the water and the legs 120 in a "raised" position relative to hull 110. In the raised position, the lower ends 120b of the legs 120 are positioned substantially above the sea floor and the upper ends 120a of legs are positioned substantially above the hull 110. In other words, the hull 110 is axially positioned proximal to the lower end 120b of each leg 120 and upper end 120a of each leg 120. Once the jack-up rig 100 is positioned at the desired offshore location, the jacking systems 112 axially lower the legs 120 relative to hull 110. Once the lower ends 120b of the legs 120 engage and begin to penetrate the sea floor, the jacking systems 112 continue to urge the legs 120 axially downward relative to hull 110. As the sea floor begins to resist penetration of the legs 120 into the sea floor, continued jacking with the systems 112 begins to raise the hull 110 axially upward relative to legs 120. As a result, the hull 110 is raised out of the water. Positioning the hull 110 above the sea surface allows wave, tidal, and current loads to primarily act on the legs 120, as opposed to the hull 110, thereby offering the potential to enhance the overall stability of the jack-up rig 100 as the legs 120 provide a smaller surface area for the transfer of loads due to seas.

FIG. 1A illustrates the jack-up rig 100 configured for drilling or other hydrocarbon production operations. Upon final cessation of hydrocarbon production, the jack-up rig 100 is decommissioned, and is left largely in the state illustrated in FIG. 1B. The jack-up rig 100 may be left at sea and unmaintained, or may be brought back to shore, but regardless, the useful life of the jack-up rig 100 is largely concluded as far as hydrocarbon production is concerned. However, in accordance with the present disclosure, the jack-up rig 100 may be reconfigured to install wind turbines on a sea bed. Thus, the reconfigured or retrofitted jack-up rig is capable of facilitating generation of green energy, and has a useful life extending far beyond that of hydrocarbon production.

In one example, the jack-up rig 100 may be an American-made offshore platform to comply with The Marine Merchant Act of 1920 (e.g., the Jones Act). Compliance with the Jones Act facilitates ease of maintenance by providing American-crewed vessels access to the jack-up rig 100 for retrofitting and maintenance. Additionally, the jack-up rig 100 may be towed into a United States port for maintenance or for protection from inclement weather.

Figure 1B:
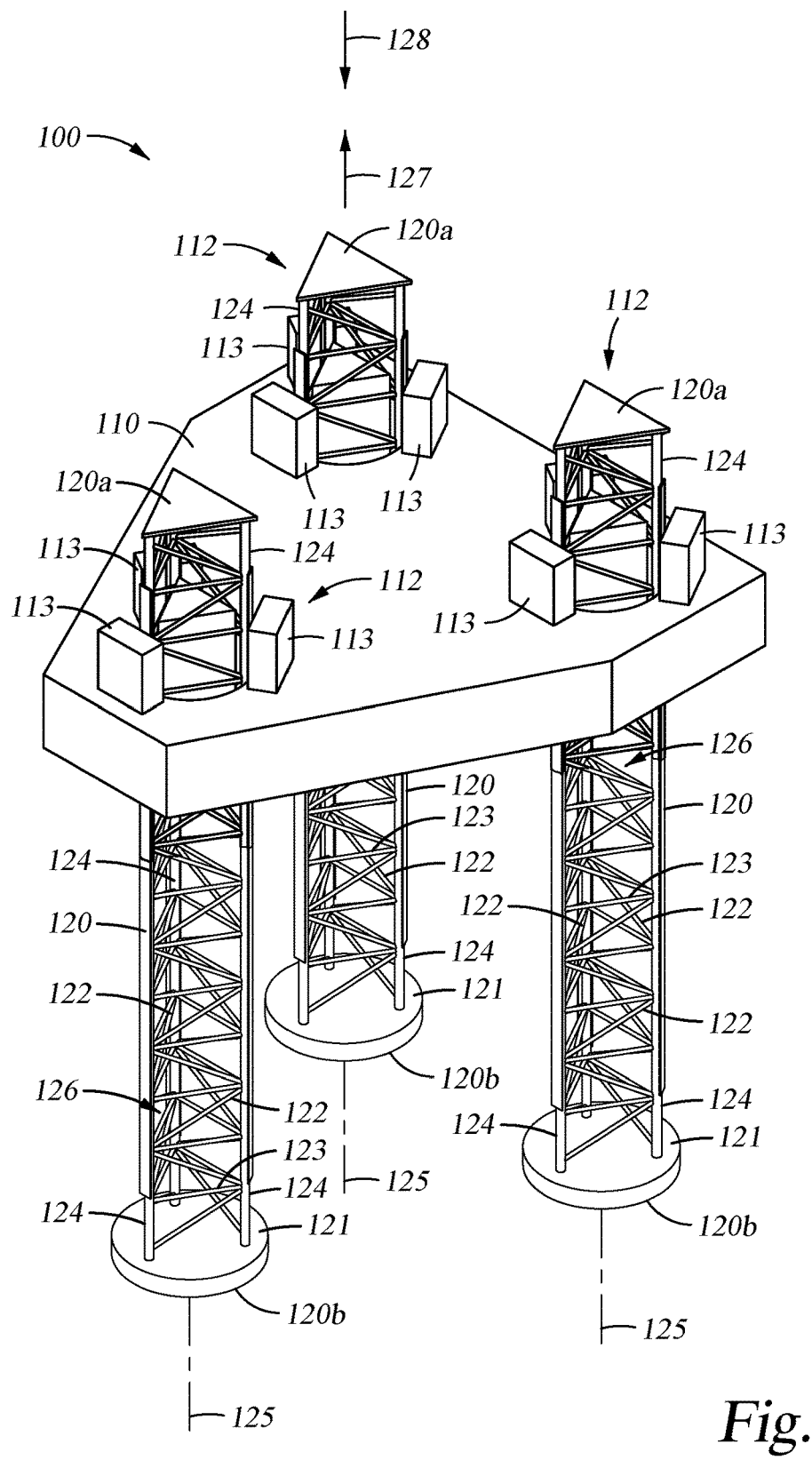

FIG. 1B illustrates the jack-up rig 100 after removal of the cantilever 141 and the derrick 140. Removal of the cantilever 141 and the derrick 140 provides additional space on the jack-up rig 100 to accommodate equipment, including one or more components of wind turbines, and equipment for the installation thereof. The cantilever 141 and the derrick 140 may be removed via a vessel (not shown) which may be positioned adjacent to the jack-up rig 100 in sufficient range to allow a crane on the vessel to remove the cantilever 141 and the derrick 140. The cantilever 141 and the derrick 140 may be positioned on another vessel for transportation.

Figure 1C:
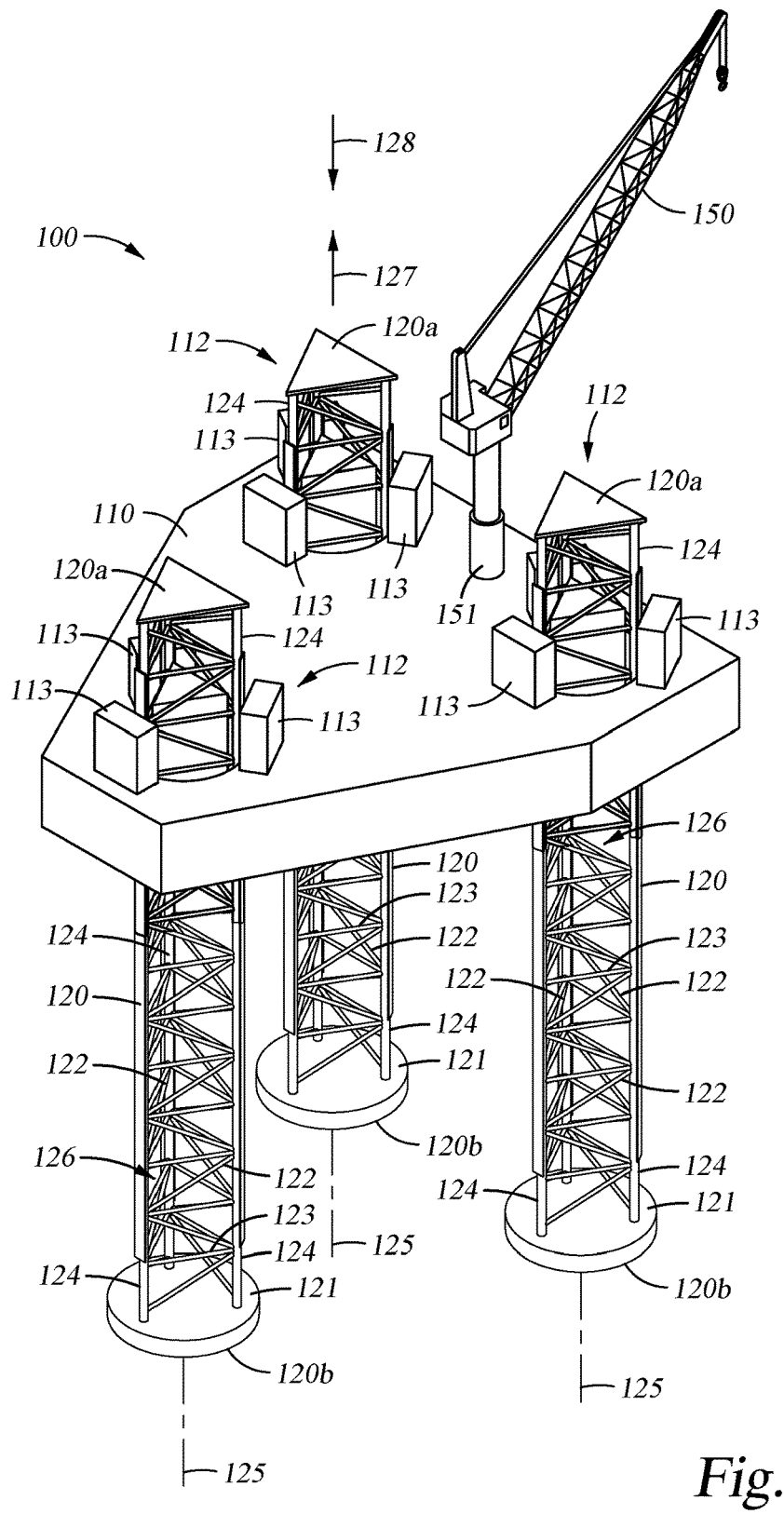

FIG. 1C illustrates the jack-up rig 100 after installation of a heavy lift crane. The heavy lift crane 150 is a crane with sufficient height- and lifting-ability to position a wind turbine of desired size on a seabed. For example, the heavy lift crane 150 may be a 600 ton to 2000 ton crane mounted on a rotatable base 151. While the jack-up rig 100 may have other, smaller cranes positioned thereon, these smaller cranes generally lack the height and lifting requirements necessary to install a wind turbine. In the configuration illustrated in FIG. 1C, the jack-up rig 100 may be towed to desired locations to install offshore wind turbines. One or more wind turbines or wind turbine components and corresponding support posts may be stored on the jack-up rig 100 during transportation to a desired offshore site. The support posts may be stored in a vertical or a horizontal configuration. Alternatively, the wind turbines and support posts may be stored on other vessels.

Figure 1D:
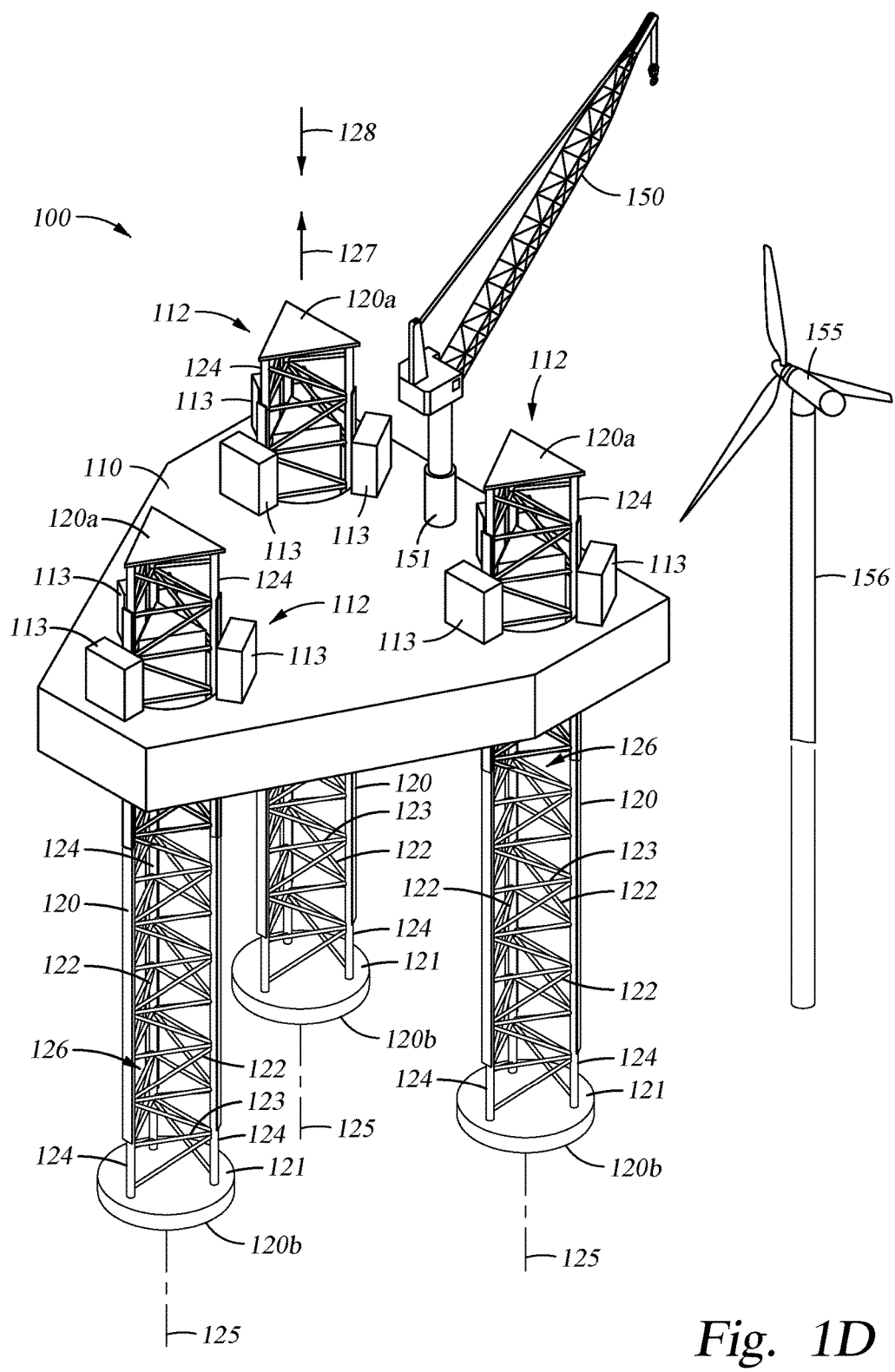

FIG. 1D illustrates the jack-up rig 100 after installation of a wind turbine 155 and a support post 156 on a seabed. To install the wind turbine 155 and the support post 156, the heavy lift crane removes the support post 156 from a vessel (not shown) which is located in the water adjacent to the jack-up rig 100, or from the hull 110 of the jack-up rig 100. The support post 156 is positioned on a sea bed or on a jacket. Subsequently, the wind turbine 155 is removed from the vessel or jack-up rig 100 by the heavy lift crane 150 and positioned atop the support post 156.

Conversion of decommissioned hydrocarbon-producing offshore installations to wind turbine installation units provides a significant "green" impact on the environment by using resources which are otherwise left in disrepair. Moreover, by selecting American-made movable platforms, the converted platforms are Jones Act compliant, and therefore can be serviced by United States ships and crews, and can be brought to United States ports for maintenance or to avoid inclement weather. The movable offshore platforms disclosed herein can be moved from location-to-location to install offshore wind turbines at multiple locations. Using movable offshore platforms, rather than ships or other vessels, provides a sturdier and more secure base for crane operations, and thus, not only are the disclosed movable offshore platform safer, but also allow installation of larger wind turbines.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    converting a movable offshore platform from a hydrocarbon producing unit to a wind turbine installation unit, the converting including removing a derrick and a derrick support structure and installing a first crane in place thereof.

2. The method of claim 1, wherein movable offshore platform is American made and is Jones Act compliant.

3. The method of claim 1, wherein the movable offshore platform is a jack-up rig.

4. The method of claim 3, wherein the jack-up rig prior to conversion includes a buoyant hull, a plurality of elongate support legs movably coupled to the buoyant hull, and the derrick supported by the buoyant hull.

5. The method of claim 1, wherein the first crane is a heavy lift crane on a rotatable base, the heavy lift crane configured to lift 600 tons to 2000 tons.

6. The method of claim 1, wherein the movable offshore platform is decommissioned prior to conversion.

7. A movable offshore platform made according to the method of claim 1.

8. The method of claim 1, wherein the derrick support structure is a cantilever.

9. The method of claim 8, wherein the converting comprises:
    positioning a vessel having a second crane thereon adjacent to the movable offshore platform;

removing the cantilever and the derrick with the second crane of the vessel; and positioning the cantilever and the derrick on the vessel.

10. A wind turbine installation method, comprising:

converting a movable offshore platform from a hydrocarbon producing unit to a wind turbine installation unit at a first location, the converting including removing a derrick and a derrick support structure and installing a first crane in place thereof;

transporting the converted movable offshore platform to a second location; and installing a wind turbine at the second location using the first crane on the converted offshore movable platform.

11. The method of claim 10, wherein movable offshore platform is American made and is Jones Act compliant.

12. The method of claim 10, wherein the movable offshore platform is a jack-up rig.

13. The method of claim 12, wherein the jack-up rig prior to conversion includes a buoyant hull, a plurality of elongate support legs movably coupled to the buoyant hull, and the derrick supported by the buoyant hull.

14. The method of claim 10, wherein the movable offshore platform is decommissioned prior to conversion.

15. The method of claim 10, wherein the derrick support structure is a cantilever.

16. The method of claim 15, wherein the converting comprises:

positioning a vessel having a second crane thereon adjacent to the movable offshore platform;

removing the cantilever and the derrick with the second crane of the vessel; and positioning the cantilever and the derrick on the vessel.

17. A method, comprising:

converting a jack-up rig from a hydrocarbon producing unit to a windmill installation unit, the converting including removing a derrick and installing a first crane in place thereof.

18. The method of claim 17, wherein the converting further includes removing a derrick support structure.

19. The method of claim 18, wherein the derrick support structure is a cantilever.

20. The method of claim 17, further comprising installing windmill at a location at sea with the jack-up rig converted to the windmill installation unit.

* * * * *